UNITED STATES PATENT OFFICE.

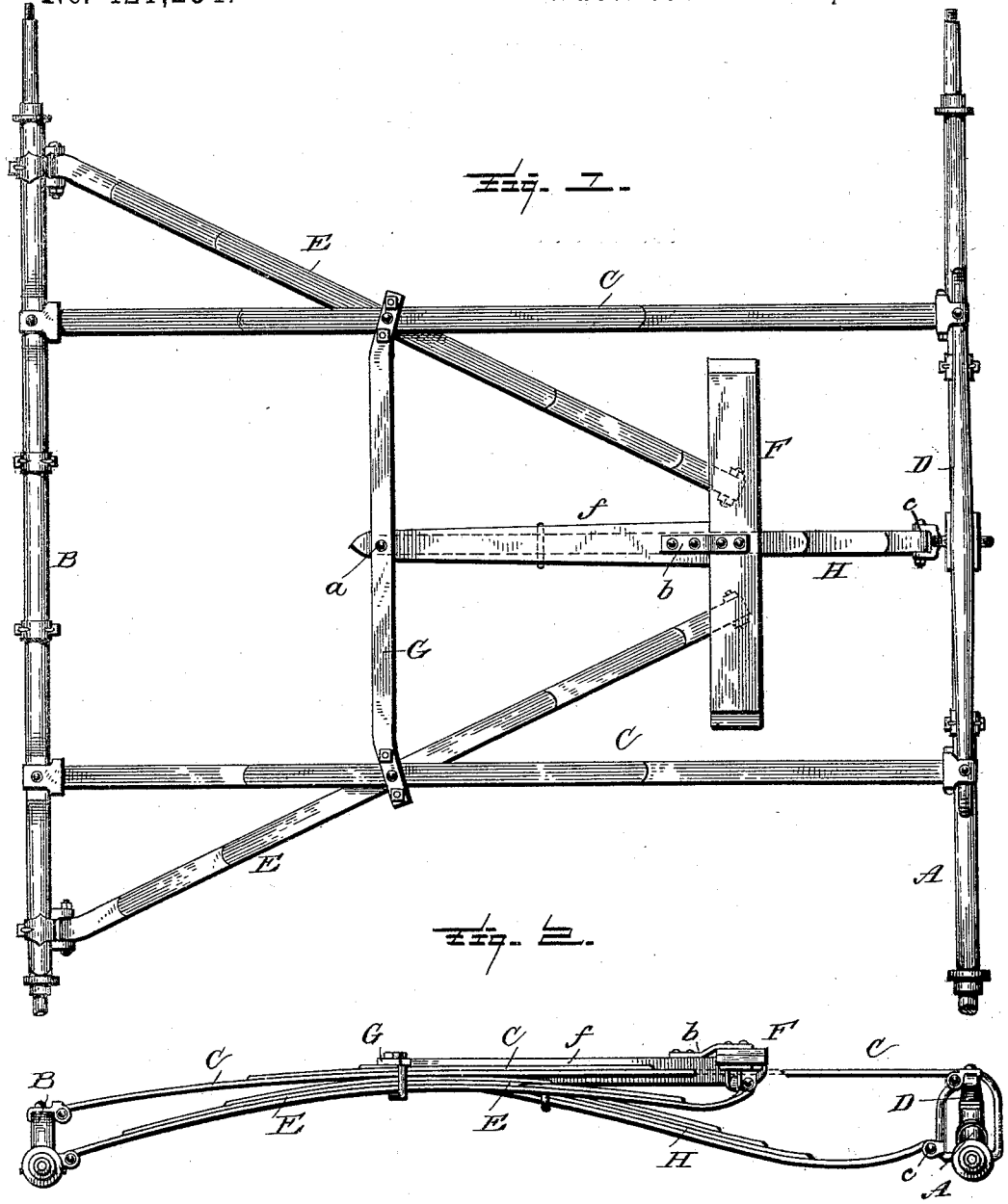

DAVID H. EMERY, OF OWEGO, NEW YORK.

RUNNING-GEAR FOR VEHICLES.

SPECIFICATION forming part of Letters Patent No. 421,254, dated February 11, 1890.

Application filed November 13, 1889. Serial No. 330,122. (No model.)

*To all whom it may concern:*

Be it known that I, DAVID H. EMERY, a citizen of the United States, residing at Owego, in the county of Tioga and State of New York, have invented certain new and useful Improvements in Running-Gear; and I do hereby declare that the following is a full, clear, and exact description of the same, reference being had to the annexed drawings, making a part of this specification, and to the letters of reference marked thereon.

This invention has relation to certain new and useful improvements in running-gear for vehicles; and the novelty resides in the peculiar combinations and arrangement of parts, all as more fully hereinafter described, shown in the drawings, and then particularly pointed out in the appended claim.

The invention is clearly illustrated in the accompanying drawings, which with the letters of reference marked thereon form a part of this specification, and in which—

Figure 1 is a top plan of a running-gear embodying my invention. Fig. 2 is a side view of the same.

Referring now to the details of the drawings by letter, A designates the front and B the rear axle. These are of ordinary construction.

C are the side springs, of any suitable or well-known form, connected at their rear ends to the rear axle and at their forward ends to the cross-bar D in any suitable manner.

E are springs extending from the outer ends of the rear axle, to which they are connected by means of a suitable shackle diagonally to the spring-bar F, to the under side of the outer ends of which they are connected by means of suitable shackles. This spring-bar has a rearward extension *f*, the rear end of which is connected, as at *a*, with the cross-bar G, the ends of which are connected to the side springs C and the diagonal springs E by means of suitable clips. A suitable brace *b* connects the cross-piece and rearward extension of the spring-bar, as shown in both of the figures of the drawings.

H is a spring connected at its rear end to the under side of the extension of the spring-bar and at its forward end hinged to the front axle near the king-bolt, as shown at *c*.

The spring-bar F and the cross-bar G form a support for the body of the vehicle. (Not shown.)

By this construction I provide a very strong and easy-riding vehicle, and the parts are so connected and braced as to render it very durable and not liable to injury under heavy loads.

What I claim as new is—

The combination, with the front and rear axles, of the side springs pivotally connected at their front end to the front axle and pivotally connected at their rear ends to the rear axle, the cross-bar G, connecting the side springs in rear of their longitudinal center, the spring-bar F between the cross-bar and the front axle and disconnected from the side springs, the diagonal springs pivotally connected at their rear ends to the rear axle and pivotally connected at their forward ends to the spring-bar, the spring H, connecting the spring-bar with the front axle, the extension *f*, extending rearward from the spring-bar and attached to the cross-bar, the side and diagonal springs being connected at their points of intersection, and the piece *b*, connecting the extension with the spring-bar, all substantially as shown and described.

In testimony that I claim the above I have hereunto subscribed my name in the presence of two witnesses.

DAVID H. EMERY.

Witnesses:
AARON STEELE,
T. B. OAKLEY.